United States Patent Office 3,377,194
Patented Apr. 9, 1968

3,377,194
COATINGS FOR SURFACES CONSISTING AT LEAST IN PART OF A RUBBER COMPOSITION
John Liberty Smith, Coleshill, and Anthony Geoffrey Marriott, Birmingham, England, assignors to Dunlop Rubber Company Limited, London, England, a British company
No Drawing. Filed May 18, 1964, Ser. No. 368,349
Claims priority, application Great Britain, May 25, 1963, 20,980/63
8 Claims. (Cl. 117—76)

ABSTRACT OF THE DISCLOSURE

An article having a surface of rubber composition, a coating having an outer coating layer of acrylic polymers and nitrocellulose and an intermediate layer of a composition of a vinyl monomer and rubber to adhere said outer layer to said rubber surface.

---

This invention relates to surface coatings, particularly coatings for surfaces of natural or synthetic rubber compositions, and relates especially to coatings for surfaces of leather-like sheet material comprising a textile web bonded with a natural or synthetic rubber composition.

According to the present invention, a coating for a surface consisting at least in part of a natural or synthetic rubber composition comprises an interlayer of a composition of a graft polymer of both a vinyl monomer and a natural or synthetic rubber and an outer layer formed from an aqueous polymeric composition.

The invention also provides a method of coating a surface consisting at least in part of a natural or synthetic rubber composition comprising applying to the surface of said composition an interlayer of a composition of a graft polymer of both a vinyl monomer and a natural or synthetic rubber, and applying to the interlayer an outer layer of an aqueous polymeric composition.

Preferably the aqueous polymeric composition is an acrylic polymer composition or a nitrocellulose composition, the acrylic polymer composition being particularly preferred. The polymeric material may be in solution or dispersion in water. The phrase "aqueous polymeric composition" is understood in this specification to include both a polymeric composition carried in water and such a composition after the carrier water has been wholly or partly removed.

The invention will be described with particular reference to coatings for surfaces of leather-like sheet material comprising a textile web bonded with a natural or synthetic rubber composition, a consolidated mat of interpenetrated crimped continuous fibres bonded together with a resinous or elastomeric bonding agent and also a leather-like sheet material comprising a consolidated composite sheet comprising a mat of interpenetrated crimped continuous fibres having a layer of non-woven staple fibers needled on to at least one surface of it, the continuous fibres and the staple fibres being bonded together with a resinous or elastomeric bonding agent. Further suitable sheet material is a leather-like sheet material comprising a consolidated mat of interpenetrated crimped continuous fibres bonded together with a resinous or elastomeric bonding agent, a woven fabric bonded to one surface of the mat with a resinous or elastomeric bonding agent, and a surface layer of a resinous or elastomeric composition on that surface of the woven fabric which is remote from the mat.

One or more bonding agents may be used. A preferred bonding agent is natural rubber but other suitable bonding agents include polyurethane rubber (or precursors thereof), butyl rubber, rubbery styrene/butadiene copolymers, butadiene/acrylonitrile copolymers, and polychloroprene rubber. A particularly suitable material is made from a web of bulked continuous nylon yarns with or without a layer of non-woven polypropylene staple fibres needled on to one of its surfaces using a natural rubber latex composition as the impregnant. The impregnant may contribute 75 percent of the total weight of the sheet material. The impregnated web is compressed to an average density of about 0.7 gram per cc. whereupon it provides a surface suitable for a coating in accordance with this invention. The surface may be reinforced and smoothed out by applying a preliminary coating of a rubber latex composition.

The graft polymer is a polymer consisting of molecules having a backbone chain carrying branches of different composition. The vinyl monomer which is used to prepare the graft polymer may be any suitable monomer containing a

group which is capable of copolymerising with a natural or synthetic rubber such as vinyl esters, vinylidene compounds, alkyl methacrylates and acrylates such as methyl methacrylate and ethyl acrylate, acrylonitrile, acrylamide, vinyl pyridine and styrene. The natural or synthetic rubber is preferably in the form of a latex or aqueous dispersion. Suitable rubbers are natural rubber, butadiene/styrene, butadiene/acrylonitrile and butadiene/methylisopropenyl ketone copolymers, and polybutadiene. It is preferred to make the graft polymer by subjecting the monomer in the presence of the rubber latex to ionizing radiation or by stirring the monomer in the presence of the rubber latex and an initiator system such as benzoyl peroxide or tertiary-butyl hydroperoxide or cumene hydroperoxide with a polyamine, for example tetraethylenepentamine or ethylene diamine. However, any known method of producing a graft polymer including methods of polymerising in solution may be employed. The graft polymer may suitably contain from 5–50 weight percent of polymer units derived from the vinyl monomer.

The outer layer may be any aqueous polymeric composition suitable for coating a surface. The invention is particularly intended for use with acrylic polymer outer layers and nitrocellulose outer layers since these are outer layers which provide an advantageous finish on leather-like sheet material. Among suitable acrylic polymers are polymers of methyl methacrylate with one or more different acrylic or non-acrylic monomers such as ethyl acrylate, or ethyl acrylate and butyl hexyl acrylate, or ethyl acrylate and methacrylic acid.

It is particularly preferred, when coating a surface of sheet material having natural rubber as bonding agent, to use a graft polymer based on natural rubber and methyl methacrylate in the interlayer, and to use a copolymer of methyl methacrylate with a different acrylic monomer in the outer layer.

The coatings in accordance with this invention show remarkably improved properties of adhesion to the surface of a leather-like sheet material as compared to the properties of an aqueous polymeric layer applied direct to the surface. The coatings are resistant to rubbing and scratching and to cracking after repeated flexing. A leather-like sheet material with a coating in accordance with this invention had a harder, more durable surface than an impregnated web without a coating. The interlayer of the graft polymer composition may be applied very thinly merely to improve adhesion between the outer layer and the sheet material or it may be applied more thickly as a levelling and filling layer for the sheet material.

Although the invention has been described with particular reference to coatings for surfaces of leather-like sheet material, it is to be understood that the invention is not limited thereto. For example it may be used to provide a surface coating for rubber footwear such as Wellington boots. The graft polymer composition may be applied to the surface of the footwear before the rubber composition of the footwear is vulcanised. The outer layer may be applied to the treated surface after vulcanisation.

The following test was devised to demonstrate the improved properties of adhesion obtainable with the present invention.

A coated sample of leather-like sheet material to be tested was placed on a level surface with the coated surface of the web upwards. A dural strip measuring 1 cm. x 6 cm. x 0.16 cm. was brushed lightly on a 5 cm. length of one face with an adhesive system available from Ciba Limited consisting of an epoxy resin adhesive known as Araldite AY105 mixed with an equal quantity by weight of hardener HY953F. This adhesive-treated face of the dural strip was pressed onto the sample with a 1 kg. weight resting on a cover plate and the adhesive was cured by heating the assembly for 1 hour at 60° C. followed by 12 hours standing at room temperature.

The sample was trimmed into a test piece about 12 cms. long and 1 cm. wide. Five cms. length at one end of this test piece had been adhered to the dural strip. One cm. length near the centre of the test piece lay beside but was not adhered to the dural strip. Six cms. of the test piece extended freely beyond the uncovered end of the dural strip. This free end of the test piece was bent back through 180°. The uncovered end of the dural strip could then be inserted into one of the jaw elements of an Instron tensile testing machine while the free end of the test piece was inserted into the other jaw element. Since the test piece was bent back through 180°, the action of the machine in moving the jaw elements vertically apart tended to peel the test piece away from the dural strip at the point where the test piece was bent back. The strength of the epoxy resin adhesive system was such that failure occurred not between the test piece and the dural strip but between the outer layer of the coating and the substrate on the test piece itself. The jaws of the test machine were separated at 50 cm. per minute and the chart on the machine was set to give a full scale reading at 2–3 kg. load at a chart speed of 50 cm. per minute. The area under the graph traced on the chart of the Instron test machine was a direct measure of the work done in peeling the outer layer of the coating from the substrate of the test piece. The results were expressed as the work done in peeling 1 sq. cm. of the outer layer.

Various embodiments of the invention and the methods of making them will now be described in the following examples in which all parts are parts by weight, unless otherwise indicated.

EXAMPLE I

This example describes the production of a piece of leather-like sheet material, the production of a graft polymer composition and the production of an acrylic polymer composition and the coating of the sheet material with layers of the two compositions.

Fifteen grams of continuous bulked 6-denier nylon were combined with 10 grams of 3-denier polypropylene staple fibre to form a fibrous web one-foot square. The web was passed four times through a needle-loom so that the web was pierced by barbed needles set so that they penetrated ⅛-inch below the web at their lower point. This method of needling is described in United States Patent 3,235,935.

A natural rubber latex composition was prepared as follows, using a natural rubber latex containing 60 percent total solids.

|  | Dry wt. (gms.) |
|---|---|
| Natural rubber latex | 100 |
| Sulphur | 1 |
| Antioxidant | 1 |
| Zinc dibutyl dithiocarbamate | 0.5 |
| Lamp black | 0.3 |

To 126 gms. of this composition were then added the following ingredients to form an impregnating composition:

|  | Wet wt. (gms.) |
|---|---|
| Aqueous potassium oletae solution (15 percent | 4.8 |
| Distilled water | 65 |
| Aqueous zinc oxide dispersion (50 percent) | 4.3 |
| Aqueous ammonium chloride (20 percent) | 5.75 |

A sample of the impregnating composition was poured into a one-foot square stainless steel tray which was maintained in a horizontal position and which was subsequently heated to 60° C. in a water bath. The needled web was placed in the composition in the tray with the face of the web consisting mainly of polypropylene fibres turned downwards. The impregnating composition was distributed throughout the web and coagulated by warming the tray to 60° C. The impregnated web was washed and then dried at 60° C. in an air oven with the face consisting mainly of polypropylene fibres in close contact with a smooth stainless steel sheet. This face of the dried web was reinforced by brushing with a further quantity of the impregnating composition from which the gelling agent (aqueous ammonium chloride) had been omitted. The increase in dry weight of the web was 4 grams. The impregnated web was cured at 120° C. for 15 minutes.

A graft polymer compositon was prepared as follows:—
0.36 of a gram of tertiary-butyl hydroperoxide was dissolved in 266 grams of methyl methacrylate and the solution was added, together with 1.9 grams of oleic acid and 467 grams of distilled water, to 333 grams of natural rubber latex (60 percent total solids). The mixture was stirred at room temperature for 10 minutes. 8.2 grams of an aqueous solution of tetraethylenepentamine (5 percent) was then added and stirring was continued for about 30 minutes during which time the temperature of the mixture rose to 30° C. Stirring was then stopped and after standing for one hour the graft polymer composition was ready for application to the impregnated web.

Two grams of the graft polymer composition were lightly brushed on to the reinforced surface of the impregnated web. Water was removed from the graft polymer composition by drying in an air oven.

An acrylic polymer composition was prepared as follows using a copolymer of methyl methacrylate and ethyl acrylate containing 27 percent of units derived from methyl methacrylate and 73 percent of units derived from ethyl acrylate in an emulsion (40 percent solids):

|  | Wt. |
|---|---|
| Copolymer emulsion | 10 |
| Carbon black dispersion (40 percent solids) | 10 |
| Water | 200 |

One gram of this composition was applied by spraying on to the surface of the cured web already coated with the graft polymer composition. The web was pressed briefly against a warm polypropylene sheet to produce a smooth appearance.

The coating could not be removed by rubbing or scratching, and after a 2½ inch-square sample of the web had been subjected to flexing in a vamp flexing machine no peeling of the coating was noted after 1.2 million flexes.

A similar web was prepared and coated with the acrylic polymer composition without an interlayer of graft polymer composition. This coating could be rubbed off a sample of the web after only two days ageing in air and the coating was observed to peel from the sample after less than 0.3 million flexes on the vamp flexing machine.

EXAMPLE II

This example describes the production of a graft polymer composition, and the testing of samples of various sheet materials coated with the graft polymer composition and an acrylic polymer composition.

A casein solution was made up as follows:

|  | Parts by volume |
|---|---|
| Casein | 100 |
| Water | 690 |
| 0.880 ammonia | 10 |

This casein solution was included in the following mixture:

|  | Parts by volume |
|---|---|
| Methyl methacrylate monomer | 100 |
| Natural rubber latex (60% solids) | 333 |
| Water | 100 |
| Casein solution | 66 |

This mixture was subjected to X-rays from a cobalt-60 source. The total radiation dose acquired by the sample was 0.4 megarad at a dose rate of $2.5 \times 10^4$ rads per hour. The graft polymer which resulted from this treatment contained 33% by weight of units derived from methyl methacrylate.

Samples of an impregnated web were prepared as in Example I. The faces of the dried webs consisting of polypropylene fibres were reinforced by brushing onto each sample one of the following four rubber latices or one solution which have the abbreviations shown in Table 1 below:

Table 1

Natural rubber: NR
Butadiene/methyl isopropenyl ketone: B/MIK
Butadiene/styrene copolymer containing 50 mole percent styrene: SBR 50
Butadiene/acrylonitrile copolymer known as Hycar 1571: B/Ac
Polyurethane known as Estane UC present at a 20% by weight solution in methyl ethyl ketone: P The dry weight of rubber deposited was about 10 gm. per 1,000 sq. cm. of surface covered. These reinforced surfaces provided the surfaces consisting at least in part of a natural or synthetic rubber composition which were to be coated in accordance with the invention.

Each sample was divided into two portions, and one portion was regarded as a "control sample." The non-control sample was coated by spraying with the graft polymer described above to an extent of about 2 gm. dry weight per 1,000 sq. cm. surface area. The graft polymer was dried at 60° C. Both treated and control samples were then compressed to an apparent density of 0.7 in a spaced mould at 150° C. for two minutes. All the samples were wiped on their reinforced surfaces successively with benzene and methanol.

The acrylic polymer composition described in Example I was applied by spraying onto the reinforced surfaces of all the samples. Four coats were applied to each sample, each coat being dried at 60° C.

The treated and the control samples were then used to make test pieces for the test described before the examples in this specification.

The following results for the work done to peel 1 sq. cm. of the acrylic polymer layer from the substrate were obtained, the results being shown in gm. cms.

| Surface Polymer | Control | Treated |
|---|---|---|
| NR | 78 | 620 |
| B/MIK | 109 | 414 |
| SBR 50 | 126 | 415 |
| B/Ac | 450 | 615 |
| P | 480 | 562 |

These results show that the presence of the graft polymer interlayer improved the adhesion of the acrylic polymer outer layer to the substrate remarkably in the case of all the reinforcing surface polymers tested.

EXAMPLE III

This example describes the use of various graft polymers in the interlayer.

Samples of impregnated webs were prepared as in Example I and the polypropylene surfaces were reinforced with natural rubber latex as described in Example I. The samples were pressed to an apparent density of 0.7.

The following graft polymers were prepared using the initiator systems indicated. In each case the vinyl monomer shown was grafted on to natural rubber latex and the graft polymer contained the weight percentage indicated of units derived from the vinyl monomer. The abbreviations are referred to in Table 2.

Table 2

(i) Using a tertiary butyl hydroperoxide/tetraethylene pentamine system:

Vinyl pyridine, 10 weight percent: VP
Acrylonitrile, 10 weight percent: AcN
Ethyl acrylate, 33 weight percent: EAc
Acrylamide, 33 weight percent: AcA (ii) Using a cumene hydroperoxide/ethylene diamine system:

Styrene, 25 weight percent: S (iii) Using the radiation system described in Example II:

Methyl methacrylate, 33 weight percent: MMAc

These graft polymer latices were applied by spraying to the reinforced surfaces of the samples to the extent of 2 gm. polymer per 1,000 sq. cm. surface area. The acrylic polymer composition described in Example I was applied by spraying as in Example I. Four coats were applied, each coat being allowed to dry.

The coated samples were used to make samples for the adhesion test described above. The following results for the work done in peeling the acrylic polymer coating from the substrate were obtained, the results being shown in gm. cms.

| Graft polymer used: | Work |
|---|---|
| VP | 130 |
| AcN | 130 |
| EAc | 96 |
| AcA | 170 |
| S | 520 |
| MMAc | 620 |

A sample without the interlayer of a graft polymer gave a result of 78 gm. cms. These results show that all of the graft polymers tested in the interlayer improve the adhesion of the acrylic polymer outer layer to a substrate.

EXAMPLE IV

This example describes the use of various acrylic polymer compositions in the outer layer.

Samples of impregnated, reinforced, pressed webs were prepared as in Example III.

The graft polymer described in Example II was applied by spraying to the extent of 2 gm. polymer per 1,000 sq. cm. surface area.

Acrylic polymer compositions were prepared by adding the following polymer dispersions or solutions to equal weights of pigment dispersion. The abbreviations shown are referred to in Table 3.

Table 3

Methyl methacrylate/ethyl acrylate containing units derived from the monomers in the ratio 27/73: MMAc/EAc Ethyl acrylate/butyl hexyl acrylate/methyl methacrylate containing units derived from the monomers in the ratio 75/10/15: EAc/BHAc/MMAc Ethyl acrylate/methyl methacrylate/methacrylic acid containing units derived from the monomers in the ratio 71/26/3: EAc/MMAc/MAcA These acrylic polymer compositions were applied by spraying to the samples treated with graft polymer. Four coats were applied and allowed to dry then the samples were used to make test pieces for the adhesion test described above.

The following results were obtained for the work done to peel 1 sq. cm. of the various acrylic polymer layers from the substrate, the results being in gm. cms.:

| Acrylic polymer composition: | Work |
|---|---|
| MMAc/EAc | 301 |
| EAc/BHAc/MMAc | 157 |
| EAc/MMAc/MAcA | 208 |

A control sample having an outer layer of the MMAc/EAc composition but without the graft polymer interlayer gave a result of 78 gm. cms. These results show that the adhesion of the acrylic polymer layer to a substrate in the presence of an interlayer of graft polymer is of a different order from the direct adhesion of an acrylic polymer layer without the interlayer.

EXAMPLE V

This example describes the use of a nitrocellulose composition in the outer layer.

Samples of impregnated, reinforced, pressed webs were prepared as in Example III and a graft polymer was applied as in Example IV. Control samples without the graft polymer were also prepared.

A nitrocellulose emulsion was mixed with an equal weight of water and applied by spraying to all the samples. Four coats were applied, each coat being allowed to dry.

These samples were used to make test pieces for the adhesion test described above. The following results were obtained for the work done to peel 1 sq. cm. of the nitrocellulose finish from the substrate, the results being in gm. cms.

| Treated: | Control |
|---|---|
| 260 | 61.5 |

These results show that the presence of the interlayer of graft polymer improves the adhesion of a nitrocellulose finish to a rubber surface quite remarkably.

Having described our invention, what we claim is:

1. An article having at its surface a rubber composition in which the rubber component is a member of the class consisting of natural and synthetic rubbers, a coating inner layer of a graft polymer of a vinyl monomer taken from the group consisting of acrylonitrile, acrylamide, vinyl pyridine, styrene, alkyl methacrylates and alkyl acrylates, and a rubber of the class consisting of natural and synthetic rubbers adhered to said article at said surface, and a coating outer layer of a composition selected from the group consisting of acrylic polymers and nitrocellulose adhered to said coating inner layer.

2. An article according to claim 1 wherein the graft polymer is a polymer of both a vinyl monomer and natural rubber latex.

3. An article according to claim 1 wherein the vinyl monomer is methyl methacrylate.

4. An article according to claim 1 wherein the vinyl monomer is ethyl acrylate.

5. Sheet material comprising a textile web having at a surface a rubber composition, a coating interlayer of a composition of a graft polymer of both a vinyl monomer taken from the group consisting of acrylonitrile, acrylamide, vinyl pyridine, styrene, alkyl methacrylates and alkyl acrylates, and a rubber adhered to said material at said surface and a coating outer layer of a composition selected from the group consisting of acrylic polymers and nitrocellulose adhered to said coating interlayer.

6. The sheet material of claim 5 in which said textile web is bonded with a natural latex rubber composition.

7. The sheet material of claim 6 in which the composition at the surface of said textile web is a natural rubber latex composition and in which the rubber of said coating interlayer is a natural rubber and in which coating outer layer is a composition of methyl methacrylate with another vinyl monomer.

8. A method of adhering a coating to a rubber surface which comprises applying to said surface a coating interlayer of a composition of a graft polymer of a vinyl monomer and rubber and applying to said interlayer an outer layer of an aqueous dispersion of a member of the group consisting of nitrocellulose and acrylic polymers.

References Cited

UNITED STATES PATENTS

| 2,422,550 | 6/1947 | Jacobson | 260—4 |
| 2,857,360 | 10/1958 | Feuer | 260—879 |
| 2,973,284 | 2/1961 | Semegen | 117—76 |
| 2,978,785 | 4/1961 | Wenzell et al. | |
| 3,012,911 | 12/1961 | Moser | 117—140 |
| 3,026,293 | 3/1962 | Caldwell et al. | |
| 3,125,462 | 3/1964 | Rachinsky | 117—140 |
| 3,143,522 | 8/1964 | Conard et al. | 260—880 |
| 2,697,048 | 12/1954 | Secrist. | |

WILLIAM D. MARTIN, *Primary Examiner.*

T. G. DAVIS, *Assistant Examiner.*